United States Patent [19]

Belcher

[11] Patent Number: 4,807,899
[45] Date of Patent: Feb. 28, 1989

[54] HITCH ASSEMBLY

[76] Inventor: Nicky G. Belcher, 500 N.W. 27th St., Moore, Okla. 73160

[21] Appl. No.: 164,216

[22] Filed: Mar. 4, 1988

[51] Int. Cl.⁴ .............................................. B60D 1/00
[52] U.S. Cl. ................................ 280/477; 280/479.2; 280/479.1
[58] Field of Search ............... 280/477, 478 R, 478 A, 280/479 B

[56] References Cited

U.S. PATENT DOCUMENTS

| | | | |
|---|---|---|---|
| 2,170,983 | 8/1939 | Adams | 280/478 R |
| 3,345,082 | 10/1967 | Atkins | 280/477 |
| 3,596,925 | 8/1971 | Richie | 280/477 |
| 3,738,683 | 6/1973 | Tate | 280/478 R |
| 3,761,113 | 9/1973 | Smitherman | 280/478 R |
| 3,848,895 | 11/1974 | Christopher | 280/478 R |
| 4,042,254 | 8/1977 | Allen | 280/477 |
| 4,125,272 | 11/1978 | Putnam | 280/478 B |
| 4,178,011 | 12/1979 | Kirsch | 280/477 |
| 4,466,632 | 8/1984 | DeVorak | 280/478 B |

Primary Examiner—John A. Pekar
Attorney, Agent, or Firm—Laney, Dougherty, Hessin & Beavers

[57] ABSTRACT

A hitch assembly for use with a tow vehicle which includes a receiver defining a tubular passage way mounted on the rear of the vehicle in longitudinal alignment, a winch extending a retractable cable rearward through said passage way, and a hitch bar connectable to the end of the cable as well as to the hitch fixture of the towed element, whereby the cable can be retracted to draw the hitch bar up within the receiver passage way with the towed element aligned and the hitch connection locked.

17 Claims, 3 Drawing Sheets

U.S. Patent  Feb. 28, 1989  Sheet 3 of 3  4,807,899
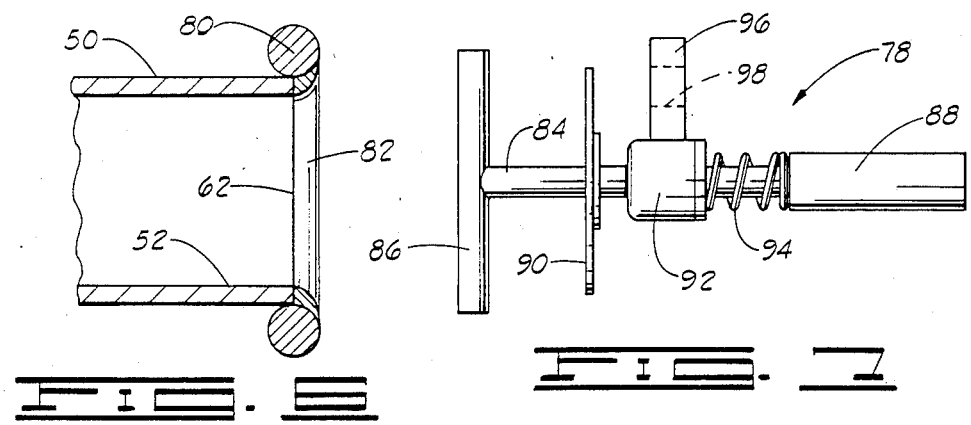
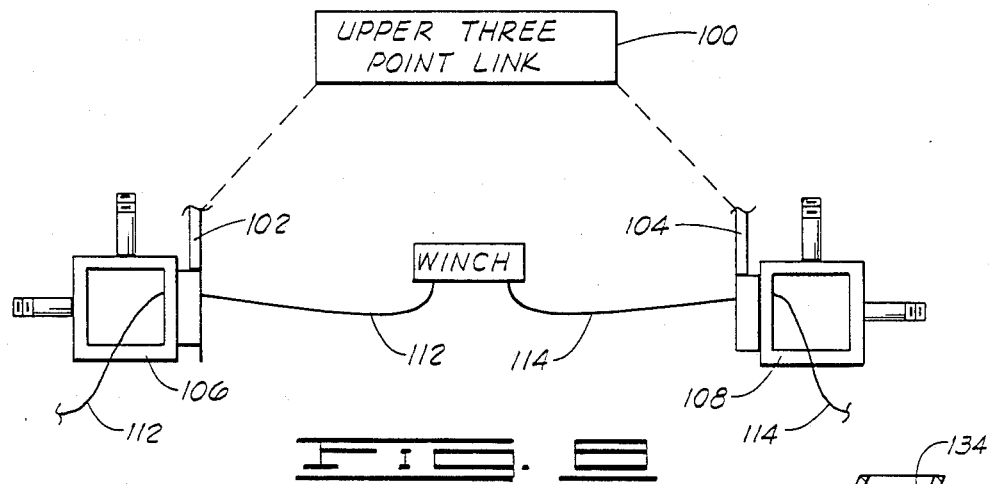
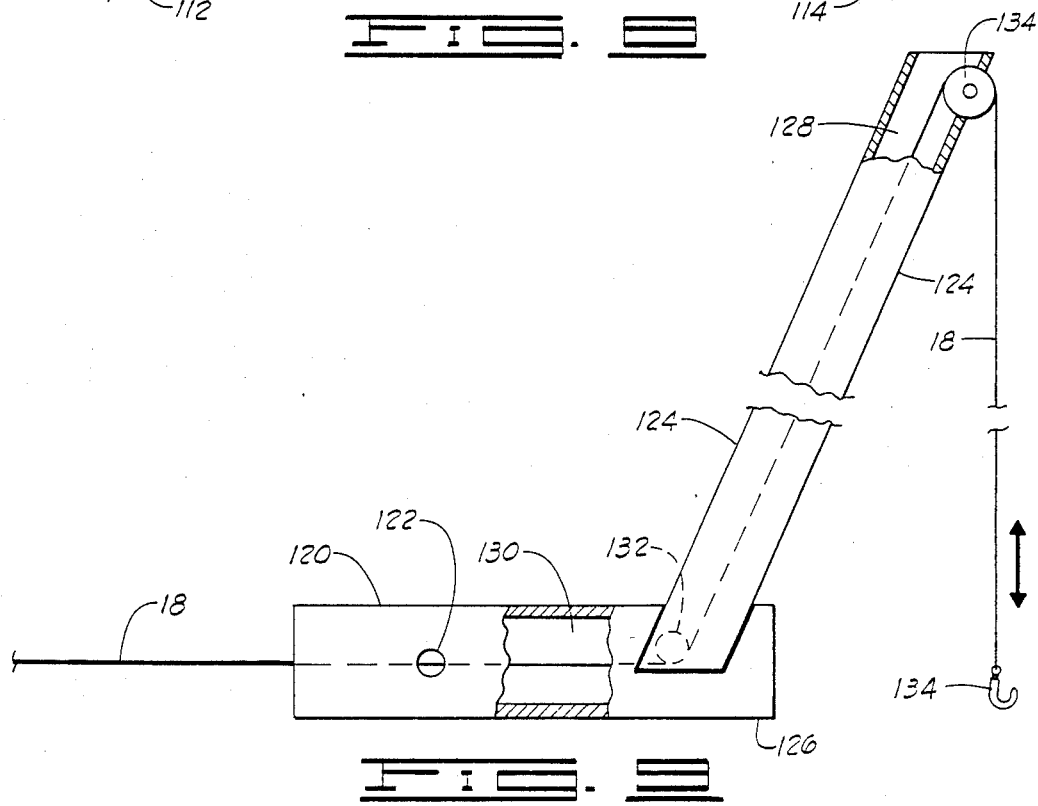

HITCH ASSEMBLY

BACKGROUND OF THE INVENTION

1. Field of the Invention

The invention relates generally to trailer or implement hitches and, more particularly, but not by way of limitation, it relates to an improved form of hitch assembly that enables greater versatility in operation and usage.

2. Description of the Prior Art

The prior art includes a number of different types of hitches as used for various forms of tow vehicles, farm tractors and other draft vehicles and such hitch assemblies take many and varied forms as dictated by specific applications. One prior form of trailer hitch that is of particular interest in relation to the present invention is U.S. Pat. No. 3,521,908 in the name of Carter which teaches a self-aligning trailer hitch of a type wherein a pivotal and outward extending hitch element may be connected and then powered by means of a hydraulic retractor into alignment and secure retention within a tubular guide. Thus, the hitch is designed to provide a means whereby the towing vehicle may be coupled to the trailer or other vehicle to be towed without the need for precise prior positioning of the main hitch components. The present invention greatly enlarges the function and capability of an aligning hitch wherein pull-in of the hitched element or implement is virtually unrestricted while still other drafting and lifting functions can be carried out using the retractable cable structure.

SUMMARY OF THE INVENTION

The present invention relates to an improved type of self-aligning trailer hitch which consists of a receiver section that defines a tubular passage and is secured in axial longitudinal alignment at a selected position on of a towing vehicle, e.g., on a rear bumper structure. A suitable form of winch is then mounted adjacent the receiver structure to retractably extend a cable rearward through the tubular passage for connection to a hitch bar that is adapted for hitch affixure to a trailer or implement that is to be towed. Thereafter, the cable can be retracted to draw the hitch bar for tight, locked reception up within the tubular passage thereby to place the tow in operational attitude.

Therefore, it is an object of the present invention to provide an improved aligning trailer hitch that has much greater range of operation.

It is also an object of the present invention to provide an improved hitch assembly that may be readily adapted to perform additional lifting and/or drafting operations.

It is yet further an object of the invention to provide a versatile hitch assembly that is simple and economical of construction.

Finally, it is an object of the present invention to provide a self-aligning, self-locking hitch assembly that is usable not only with conventional tow vehicle connections but also three-point and other tractor connections for various types of implement.

Other objects and advantages of the invention will be evident from the following detailed description when read in conjunction with the accompanying drawings which illustrate the invention.

BRIEF DESCRIPTION OF THE DRAWINGS

FIG. 6 is a partial section of a receiver tube showing an alternative structure;

FIG. 7 is a view in elevation of the locking pin of the present invention;

FIG. 8 is a rear view in idealized and partial block form of hitch receivers as employed with a three-point hitch; and FIG. 9 illustrates in side elevation with parts shown in cutaway an alternative form of hitch bar structure that includes a crane bar addition for lifting operations.

DETAILED DESCRIPTION OF THE INVENTION

Figure 1:
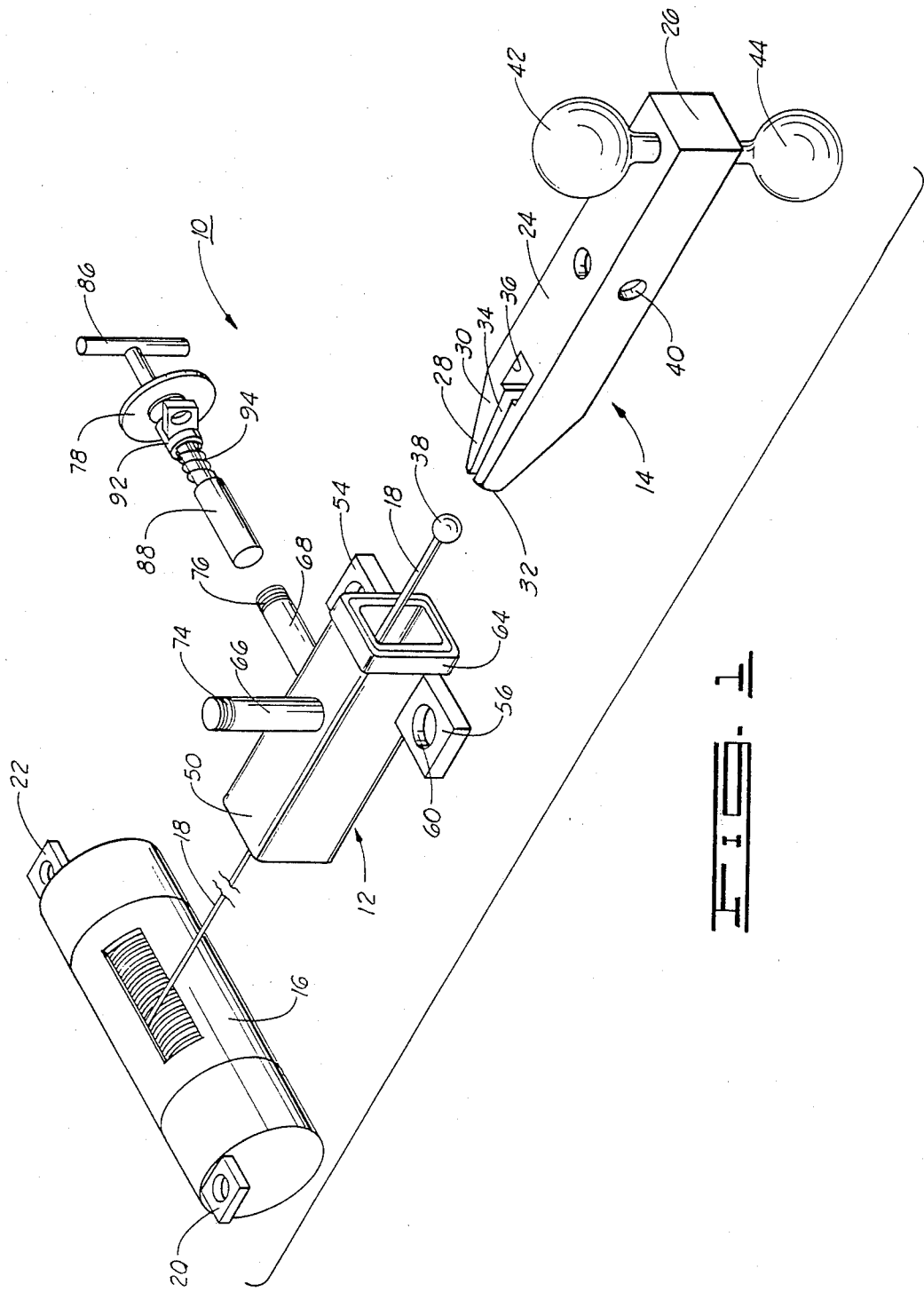
FIG. 1 is an exploded perspective view of a trailer hitch assembly constructed in accordance with the present invention.

FIG. 1 illustrates the hitch assembly 10 as it consists of a receiver 12 for attachment to the tow vehicle and a hitch bar 14 for connective coaction. A suitable form of winch 16 is secured at a position forward of receiver 12 to extend retractably a cable 18 through receiver 12 for releasable connection to hitch bar 14.

The winch 16 may be any of a number of suitable electric or hydraulic winches which are adapted to include securing plates 20 and 22 that may be bolted to frame or body structure of the tow vehicle or tractor at a suitable location forward of the receiver 12. In present form, the winch 16 is a Superwinch Model X-2 manufactured by Superwinch, Inc. of Putnam, Conn. The winch has a capacity of 2500 pounds and the weight and diameter of cable 18 is selected accordingly. It should be understood however that a greater or lesser capacity limit device may be chosen depending upon the exigencies of the particular application. The winch 16 may be controlled from a switch located proximate receiver 12 as well as a remote switch (not shown) which may be located in the truck cab or other driving location.

Figure 2:
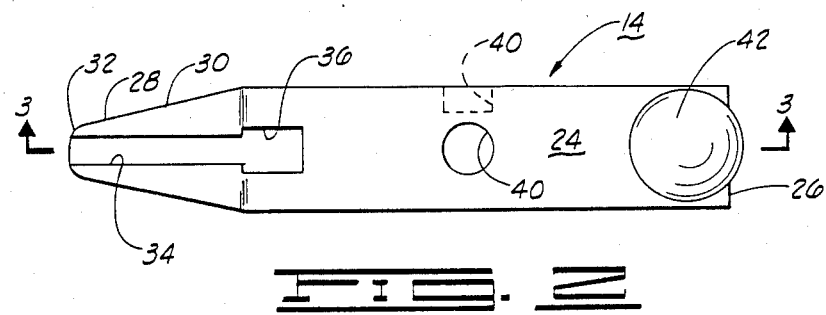
FIG. 2 is a top plan view of the hitch bar of the present invention.
Figure 3:
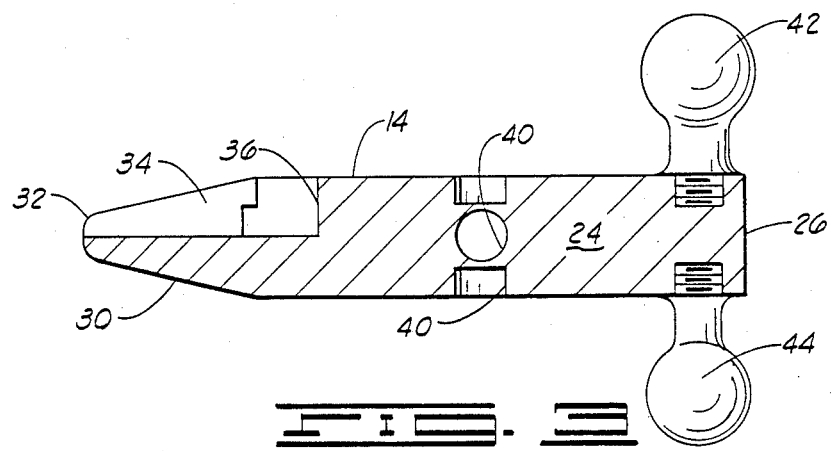
FIG. 3 is a view in section taken along lines 3—3 of FIG. 2.

Referring also to FIGS. 2 and 3, the hitch bar 14 which may be formed of suitable steel bar stock as a square bar 24 having a rear end 26 and a narrowed front end 28. The narrowed front end 28 is formed as the square bar is narrowed pyramidally as at surfaces 30 and these pyramidal surfaces, in turn, are rounded into a ball-shaped nose 32. A longitudinal slot 34 is formed axially through nose 32 along the upper half of bar 24 to terminate in a square retention hole 36 of slightly greater width than slot 34. Both the slot 34 and the retention hole 36 open upwardly so that the cable 18 with terminal ball 38 can be dropped down into slot 34/hole 36 and retained therein versus longitudinal forces on bar 24.

One or more locking holes 40 are formed about the mid-portion of bar 24 for locking purposes, as will be further described below. The rear end of bar 24 is adapted to carry selected hitch structure. In this case, bar 24 is shown carrying one or more hitch balls 42 and 44, e.g., a two-inch ball 42 and a 1⅝ inch ball 44. The balls 42, 44 may be secured to bar 24 in any of several ways, threads, bolt, etc. In addition, it should be understood that other types of hitch may be secured on bar 24 such as the pintle eye or military-type hitch or other specialized hitch connections such as the aircraft tow hitch. There is virtually no limitation as to hitch type which can be utilized with the alignment and locking device of the invention.

Figure 4:
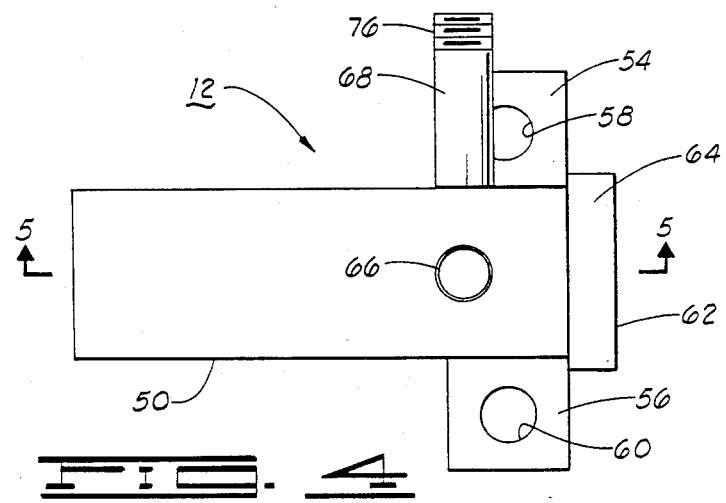
FIG. 4 is a top plan view of the receiver of the present invention.
Figure 5:
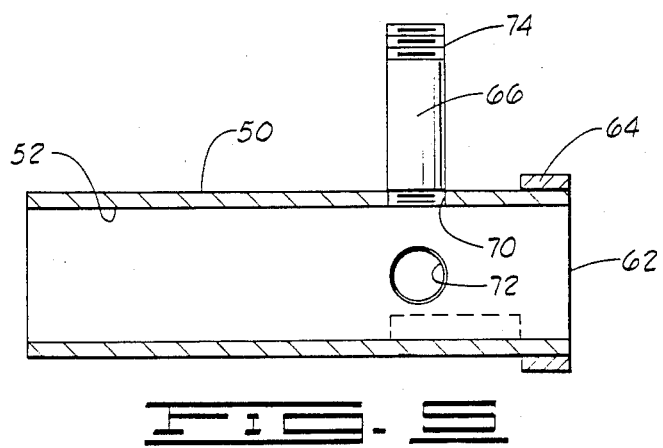
FIG. 5 is a view in section taken along lines 5—5 of FIG. 4.

Referring to FIGS. 4 and 5, the receiver 12 may be formed from a suitable section of steel tube stock 50 of selected length. As illustrated, tube stock 50 is square tube stock defining an inside square passage 52 and having a pair of securing tabs 54, 56 with holes 58, 60 secured as by welding on each side of the rearward end 62 at the respective lower extremities. The tabs 54 and 56 are secured slightly forward of the rear end 62 in order to accommodate a heavy metal reinforcing band 64 as secured around the outer end surface of tube 50. The band 64 may be secured as by welding and it may be selected to be of thickness as required for particular applications. Right-angularly displaced locking tubes 66 and 68 are secured to the top and an adjacent side of receiver tube 50 as they are secured in alignment with respective locking holes 70 and 72, and tubes 66 and 68 each include outer threads 74 and 76 for coaction with a locking pin 78.

FIG. 6 shows an alternative form of structure for receiver tube 50 which may be utilized for heavier applications and which provides a more rounded entry edge into the rear opening of rear end 62. Thus, such as a section of one-half inch steel bar 80 may be welded around the rear end 62 with weldment 82 disposed outwardly around the square tubular surface, and the overall effect is to present a more rounded opening edge into the square tubular passage 52.

Referring to FIG. 7, the locking pin 78 consists of a support rod 84 formed with a T-handle 86 and being secured to lock plunger or cylinder 88. The lock cylinder 88 is of a diameter that is adapted to be closely received through locking holes 70 and 72 of receiver tube 50 (FIG. 5) when aligned with respective ones of holes 40 of hitch bar 24. A retainer plate 90 is affixed on rod 84 adjacent the T-handle 86 and a threaded locking cap 92 and compression spring 94 are retained adjacent cylinder 88. Thus, when in locked attitude, with cylinder 88 aligned through a pair of mating locking holes, the threaded cap 92 may be threadedly engaged over respective threads 74, 76 to secure the hitch in the locked position. The locking cap 92 includes a tab 96 with hole 98 for securing a neutral start switch (not shown) which coacts with plate 90 to prevent ignition of the tow vehicle unless the hitch 10 is in locked position.

In operation, the receiver 12 is suitably mounted rearward on a tow vehicle. For example, the receiver 12 could be mounted centrally on the rear bumper of a pickup truck by means of welding whereupon the winch 16 could be secured between frame elements forward and beneath the truck bed. The cable 18 can then be drawn through passage 62 and extended rearward for considerable distance for hookup with a hitch bar 14. It has been found in practice that a length of cable of about 25 feet is sufficient for all practical purposes. The lift bar 14 is placed within the ball capture assembly of the boat trailer, trailer home or other implement, and the retaining ball 38 and cable 18 are dropped down within bar slot 34 and retention hole 36. The locking pin 78 will have been inserted into, for example, tube 68 with spring 94 compressed and cap 92 firmly secured on threads 76.

Winch 16 is then operated to draw in cable 18 whereupon the trailed assembly and hitch bar 14 will progress up to the passage end 62 of receiver 12 and enter further therein; and, as the pyramidal surfaces 30 move inward they bring the bar 24 into close alignment within tubular passage 62. As the adjacent pyramidal surface 30 passes the end of lock cylinder 88 it tends to force cylinder 88 outward until, finally, a bar hole 40 intercepts the transverse position of cylinder 88 and it plunges into locked position within hole 40. At this time, the hitch bar 14 is fully retained and locked within the tubular passage 62 of receiver 12, and the trailed trailer or implement is in tow ready for movement. A trailer safety chain may be secured in tabs 54 or 56.

If it is desired to use the smaller sized ball 44, it is only necessary to turn the hitch bar 14 over 180° before inserting ball 44 into the capture assembly of the trailer and then hooking cable 18 and retainer ball 38 upward through slot 34 and retention hole 36. It also should be understood that the nose end 28 of bar 24 can receive a slot and retention hole on opposite sides of the pyramid portion 30. In addition, while ball hitches are illustrated it should be fully understood that any number of different hitch connectors may be utilized as mounted for connection between rear end 26 of bar 24 and the mating trailer assembly.

FIG. 8 illustrates a useful embodiment wherein a pair of self-aligning hitches are utilized with a three-point tractor hitch. Thus, the three-point hitch consists of the upper three point link 100 functioning with the lower three point lift arms 102 and 104. First and second receivers 106 and 108 are then secured on the respective lift arms by welding, bolts or the like, in order to receive respective hitch bars (not shown). A suitable winch 110 is mounted forward of the receiver assemblies to extend first and second operating cables 112 and 114 through the respective tubular passageway of receivers 106 and 108 and rearward for releasable connection to a respective hitch bar. Winch 110 can be a dual reeling single winch or it may be a set of two winches that are operable either in synchronism or separately.

FIG. 9 illustrates an alternative structure in the form of a lift bar 120 which may be used to provide a lifting function. Thus, the lift bar 120 may consist of a section of tubing of outer cross section suitable for close reception within the tubular passage 62 of receiver 12 which also has the locking holes 122 to assure locked retention within the receiver 12. A crane or boom structure such as a section of square tubing 124 is secured to the rearward end 126 of lift bar 120 as by welding, with the interior space 128 in communication with the interior space 130 of lift bar 120. A suitable roller or the like 132 then assures passage of cable 18 from the interior of lift bar 120 upward through crane bar 124 where it is suitably directed downward by a pulley 134 to support a hook end or other utility assembly.

In operation, the lift bar 120 is manually inserted in the receiver and this obviates the need for a pyramidal forward section on the bar. Once the locking plunger 78 is positioned with plunger 88 locked in hole 122, the winch 16 may be controlled to carry out a crane function using the cable 18 for vertical lifting operations. Further employment of a swivel extension arm at the top of crane bar 124 enables a bed loading function, e.g., for use with trucks engaged in particular haulage operations.

The foregoing discloses a novel type of self-aligning, self-locking hitch assembly that may be used in any number of hitching connection operations and with any of selected types of hitch connectors. While the embodiments of the invention are particularly described with respect to the ball-type hitch assemblies, it should be understood that the pintle eye types of hitch, aircraft tow hitches and many others may be substituted and used with the basic receiver/hitch bar combination.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A hitch assembly for use with a vehicle, comprising:
   a receiver means consisting of a tubular body having forward and rearward ends mounted axially longitudinally on the rear of said vehicle and defining a tubular passage;
   a reinforcing band secured around the rearward end of said tubular body and presenting a rounded edge entry into said tubular passage;
   power means for controlling a retractable cable mounted on said vehicle and extending said cable rearwardly through said tubular passage;
   hitch bar means connectable to said retractable cable in order to be drawn for tight reception within said tubular passage; and
   removable pin means insertable transversely into said tubular section to secure said hitch bar means when in tight reception within said tubular passage.

2. An assembly as set forth in claim 1 which further includes:
   locking means for locking the secured hitch bar means in said tight reception.

3. An assembly as set forth in claim 1 which further includes:
   hitch ball means secured on said hitch bar means.

4. An assembly as set forth in claim 1 wherein said power means comprises:
   an electric winch with reversibly driven cable reel, said winch being mounted proximate said receiver means.

5. An assembly as set forth in claim 1 wherein said hitch bar means comprises:
   a bar having front and rear ends and a cross-section similar to the tubular passage for being closely received therein, the front end of said bar being symmetrically narrowed to a rounded end that may be readily entered into the tubular passage.

6. An assembly as set forth in claim 5 which further includes:
   a hitch ball secured to the rear end of said bar.

7. An assembly as set forth in claim 6 which further includes:
   locking means for removably securing said bar within the tubular passage of said receiver means.

8. An assembly as set forth in claim 5 which further includes:
   a spring-loaded locking cylinder for placement transversely through said receiver means for locking insertion in said bar within the tubular passage.

9. An assembly as set forth in claim 1 wherein said removable pin means comprises:
   a spring-loaded locking cylinder for placement transversely through said receiver means tubular section for locking insertion in said hitch bar means.

10. An assmebly as set forth in claim 1 which further includes:
    a lift bar for alternate insertion in said tubular passage which extends an upward boom member; and
    means for guiding said cable up said boom member for extension as a lifting connection.

11. An assembly as set forth in claim 10 wherein:
    said lift bar is a bar having front and rear ends with the boom member secured to the rear end, said bar having a cross-sectional area similar to the tubular passage for close reception therein.

12. An assembly as set forth in claim 11 which further includes:
    locking means for securing the lift bar within said tubular passage.

13. A self-aligning hitch assembly for use with a vehicle, comprising:
    a three-point hitch secured to said vehicle wherein at least two of the hitch lift arms each further comprise:
    a receiver means secured on said lift arm and defining a tubular passage;
    power means controlling a retractable cable from said vehicle and extending the cable rearward through said tubular passage; and
    hitch bar means connectable to said retractable cable in order to be drawn for tight reception within said tubular passage.

14. An assembly as set forth in claim 13 wherein each said receiver means comprises:
    a tubular section mounted with said tubular passage directed longitudinally rearward of said vehicle; and
    removable pin means insertable transversely into said tubular section to secure said hitch bar means when in tight reception within said tubular passage.

15. An assembly as set forth in claim 13 wherein said tubular section comprises:
    a square tubular pipe section having forward and rearward ends; and
    a reinforcing band secured around the rearward end to present a rounded edge entry into the passage.

16. An assembly as set forth in claim 13 wherein said hitch bar means comprises:
    a bar having front and rear ends and a cross-section similar to the tubular passage for being closely received therein, the front end of said bar being symmetrically narrowed to a rounded end that may be readily entered into the tubular passage.

17. An assembly as set forth in claim 13 wherein said removable pin means comprises:
    a spring-loaded locking cylinder for placement transversely through said receiver means tubular passage for locking insertion in said hitch bar means.

* * * * *